United States Patent [19]

Lloyd et al.

[11] 4,352,266
[45] Oct. 5, 1982

[54] LAWN MOWER BRAKE AND CLUTCH DEVICE

[75] Inventors: Ronald B. Lloyd, Gilson; Gerald H. Wick, Galesburg, both of Ill.

[73] Assignee: Outboard Marine Corporation, Waukegan, Ill.

[21] Appl. No.: 247,403

[22] Filed: Mar. 25, 1981

[51] Int. Cl.³ ............................................. A01D 69/10
[52] U.S. Cl. .................................... 56/11.3; 192/18 R
[58] Field of Search ............ 56/11.3; 192/18 R, 89 A, 192/101, 995

[56] References Cited

U.S. PATENT DOCUMENTS

| | | | |
|---|---|---|---|
| 2,985,992 | 5/1961 | Dowdle | 56/11.3 |
| 3,691,859 | 9/1972 | Peters | 192/18 R |
| 3,724,620 | 4/1973 | Benson | 192/89 A |
| 4,213,521 | 7/1980 | Modersohn | 56/11.3 |
| 4,286,701 | 9/1981 | MacDonald | 192/18 R |

*Primary Examiner*—Robert A. Hafer
*Attorney, Agent, or Firm*—Michael, Best & Friedrich

[57] ABSTRACT

Disclosed herein is a combined clutch and brake comprising a drive assembly including a driving member rotatable about an axis and a driving disk fixedly extending on the driving member for common rotation therewith and against axial movement therebetween, a driven assembly mounted on the drive assembly for relative rotation therebetween and against axial movement of the driven assembly, a ring member located in encircling relation to the driving member between the disk and the driven assembly and including an upper surface having an annular friction pad including a radially inner portion in facing relation to the disk and a radially outer portion, a spring biasing the ring axially towards the disk for driving engagement by the disk with the inner portion of the friction pad, a brake member fixed against rotary movement and movable axially between a retracted position and a braking position engaged with the outer portion of the friction pad so as to disengage the ring from the disk against the action of the spring and so as to prevent rotation of the ring, and a coupling connecting the ring and the driven assembly for common rotation thereof and for relative axial movement therebetween, which coupling comprising one or more studs extending from the ring in parallel relation to the rotary axis in the direction away from the disk, and in radially outward relation from the spring and a corresponding one or more fingers extending fixedly from the driven assembly and including apertures receiving the studs to afford common rotary movement therewith and relative axial movement therebetween.

2 Claims, 4 Drawing Figures

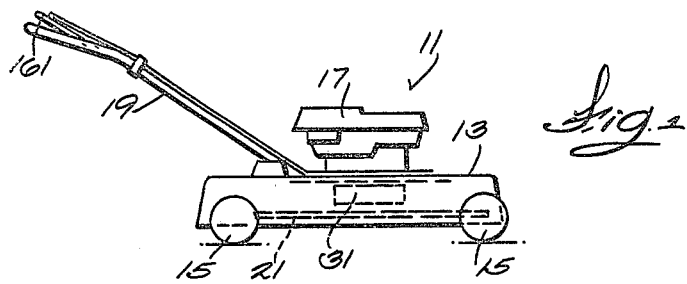
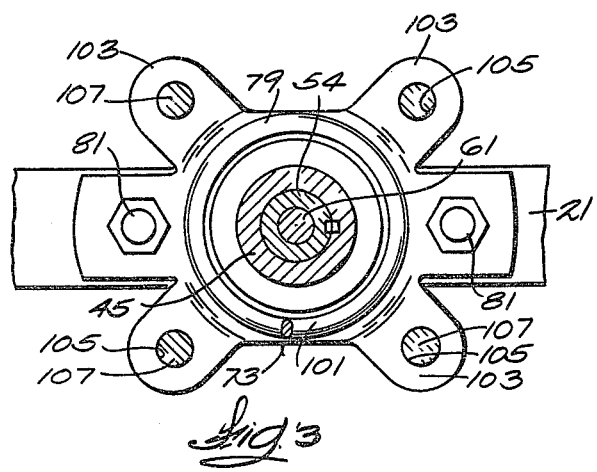
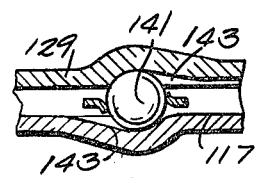
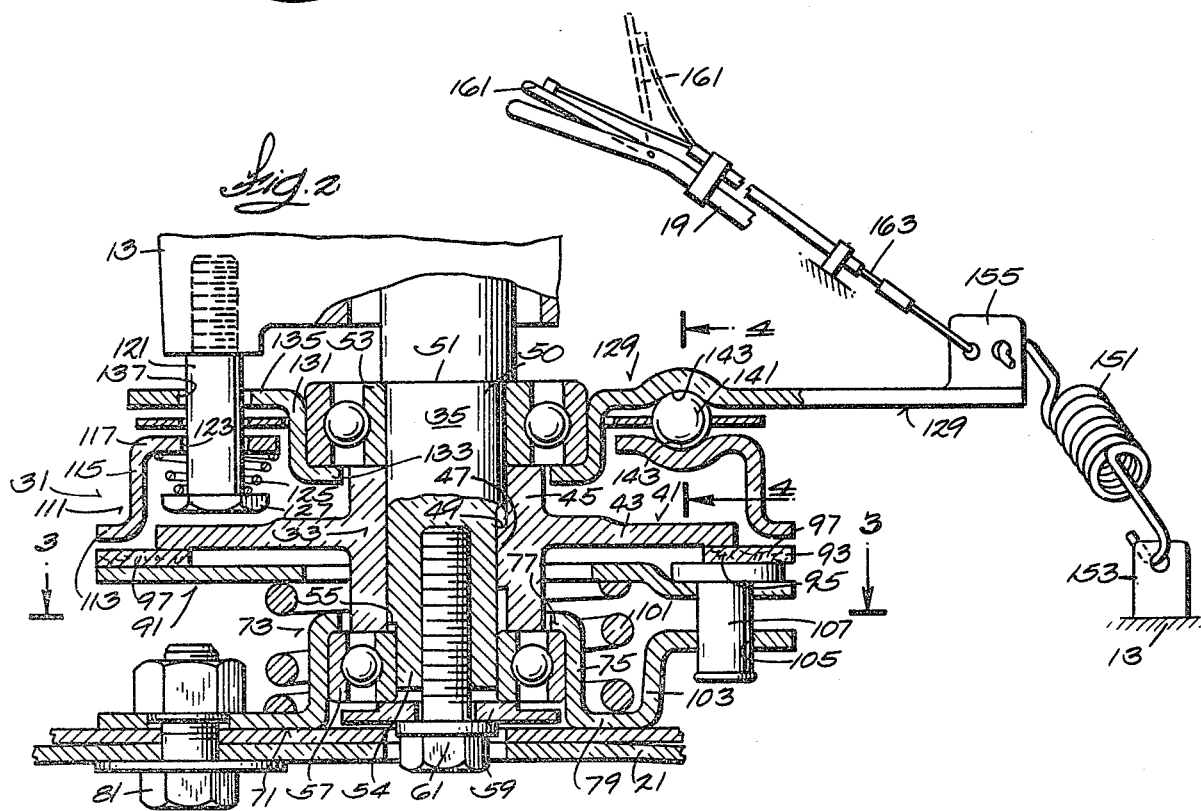

LAWN MOWER BRAKE AND CLUTCH DEVICE

BACKGROUND OF THE INVENTION

The invention relates generally to lawn mowers including combined clutch and brake mechanisms and more particularly, to combined brake and clutch mechanisms.

Attention is directed to the Lunde U.S. Pat. No. 4,141,439 issued Feb. 27, 1979 and to the Schmitzer U.S. Pat. Nos. 2,825,434 issued Mar. 4, 1958 and 2,812,047 issued Nov. 5, 1957, as well as to the Modersohn U.S. Pat. No. 4,231,521 issued July 22, 1980, all of which disclose combined brake and clutch mechanisms.

Attention is also directed to the Seifert et al. U.S. Pat. No. 4,041,679 issued Aug. 16, 1977, to the Dowdle U.S. Pat. No. 2,985,992 issued May 30, 1961, to the Rubin U.S. Pat. No. 3,367,459 issued Feb. 6, 1968, and to the Schmidt U.S. Pat. No. 2,993,329 issued July 25, 1961, all of which disclose combined brake and clutch mechanisms.

SUMMARY OF THE INVENTION

The invention provides a rotary lawn mower comprising a blade housing supported for travel over the ground, a prime mover mounted on the blade housing, a cutter blade, and a combined clutch and brake located between the prime mower and the cutter blade and comprising a drive assembly including a driving member driven by the prime mover for rotation about an axis, and a driving disk fixedly extending on the driving member for common rotation therewith and against axial movement therebetween, a driven assembly fixed to the cutter blade, means mounting the driven assembly from the drive assembly for relative rotation therebetween and against axial movement therebetween, a ring member located in encircling relation to the driving member between the disk and the driven assembly and including a friction surface having a radially inner portion in facing relation to the disk and a radially outer portion, means biasing the ring axially towards the disk for driving engagement by the disk with the inner portion of the friction surface, brake means fixed against rotary movement and movable axially between a retracted position and a braking position engaged with the outer portion of the friction surface so as to disengage the ring from the disk against the action of the biasing means and so as to prevent rotation of the ring, and means connecting the ring and the driven assembly for common rotary movement thereof and for relative axial movement therebetween, which connecting means comprises one or more studs extending from the ring in parallel relation to the rotary axis in the direction away from the disk, and in radially outward relation from the biasing means, and a corresponding one or more fingers extending fixedly from the driven assembly and including apertures receiving the studs to afford common rotary movement therewith and relative axial movement therebetween.

The invention also provides a combined clutch and brake comprising a drive assembly including a driving member rotatable about an axis, and a driving disk fixedly extending on the driving member for common rotation therewith and against axial movement therebetween, a driven assembly, means mounting the driven assembly from the drive assembly for relative rotation therebetween and against axial movment therebetween, a ring member located in encircling relation to the driving member between the disk and the driven assembly and including a friction surface having a radially inner portion in facing relation to the disk and a radially outer portion, means biasing the ring axially towards the disk for driving engagement by the disk with the inner portion of the friction surface, brake means fixed against rotary movement and movable axially between a retracted position and a brake position engaged with the outer portion of the friction surface so as to disengage the ring from the disk against the action of the biasing means and so as to prevent rotation of the ring, and means connecting the ring and the driven assembly for common rotary movement thereof and for relative axial movement therebetween, which connecting means comprises one or more studs extending from the ring in parallel relation to the rotary axis in the direction away from the disk, and in radially outward relation from the biasing means, and a corresponding one or more fingers extending fixedly from the driven assembly and including apertures receiving the studs to afford common rotary movement therewith and relative axial movement therebetween.

Other features and advantages of the embodiments of the invention will become known by reference to the following general description, claims and appended drawings.

IN THE DRAWINGS

FIG. 1 is a side elevational view of a lawn mower embodying various of the features of the invention.

FIG. 2 is an enlarged, fragmentary, partially schematic and partially sectioned view of a combined clutch and brake incorporated in the lawn mower shown in FIG. 1.

FIG. 3 is a fragmentary sectional view taken along line 3—3 of FIG. 2.

FIG. 4 is a fragmentary sectional view taken along line 4—4 of FIG. 2.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a rotary lawn mower 11 including a cutter blade housing 13 which is supported for travel over the ground by a plurality of wheels 15. Mounted on the cutter blade housing 13 is a prime mover 17, such as an internal combustion engine or an electric motor.

Also extending from the cutter blade housing 13 is a handle structure 19 by which an operator may push the mower 11 along the ground.

Carried within the cutter blade housing 13 is cutter blade 21.

Included in the lawn mower 11 is a combined clutch and brake 31 which supports the cutter blade 21 and controls delivery of power from the primer mover 17 to the cutter blade 21 and braking of the cutter blade 21 and which is preferably located within the housing 13 although it could be located above the housing 13.

The combined clutch and brake 31 includes a drive assembly 33 comprising a rotatable driving member or drive shaft 35 which extends downwardly from the prime mover 17 within the cutter blade housing 13. The driving member 35 can be the crankshaft of an internal combustion engine or the output shaft of an electric motor.

The drive assembly also includes a disk member 41 which includes a disk 43 extending from a central hub or sleeve 45 which is fixed to the drive shaft 35 for common rotation therewith and against axial movement relative thereto. In this regard, common rotary movement of the disk 43 with the drive shaft 35 is provided by means of a key 47 which extends from the hub or sleeve 45 and which is received in an axial slot 49 in the driving member or drive shaft 35. The disk 43 is fixed against axial movement by reason of the formation of the drive shaft 35 with a portion 50 which is of reduced diameter and which forms an upper annular shoulder 51 against which an upper bearing 53 is axially seated. In turn, the hub or sleeve 45 is axially seated, at its upper end, against the upper bearing 53. In addition, the drive shaft 35 includes a lower portion 54 which is further reduced in diameter and which defines a lower annular shoulder 55. Encircling the reduced diameter lower portion 54 is another or lower bearing 57 which is axially seated against the lower end of the sleeve 45 so as to prevent downward axial movement of the disk 43 relative to the drive shaft 35.

The lower bearing 57 is retained in position by a washer 59 which is secured to the drive shaft 35 by a screw 61 threaded into the bottom of the drive shaft 35.

The combined clutch and brake 31 further includes a driven assembly 71 which, in the illustrated construction, includes the cutter blade 21. More particularly, the driven assembly 71 is connected to the drive shaft 35 for rotary movement relative thereto and against axial movement in the direction away from the drive assembly 33. While various arrangements can be employed, in the illustrated construction, such means comprises a driven element or member 73 having an annular wall 75 rotatably supported by the radially outer surface of the lower bearing 57, a radially inwardly extending upper annular flange 77 extending from the top of the annular wall 75 into overlying relation to the top of the lower bearing 57 so as thereby to prevent axial downward movement of the driven member 73, and a lower flange 79 which extends from the lower end of the annular wall 75 and which is connected, by suitable means, such as bolts 81 to the cutter blade 21.

The combined clutch and brake 31 further includes an annular friction member or ring 91 which encircles the hub 45 and which is located below the lower surface of the disk 43.

Affixed to the top of the ring 91 is an annular friction pad 93 which includes a radially inner portion 95 in facing relation to the outer margin of the lower surface of the disk 43 and a radially outer portion 97 extending radially outwardly beyond the outer periphery of the disk 43.

Means are provided for urging the friction member of ring 91 into engagement with the disk 43 so as to rotatably drive the ring 91 by the disk 43 and for urging the driven member or element 73 against upward axial movement. While various arrangements can be employed, in the illustrated construction, such means comprises a helical spring 101 which encircles the hub 45 of the disk member 41 and the annular wall 75 of the driven element 73, and which, at its upper end, bears against the lower surface of the annular ring 91 and, at its lower end, bears against the lower annular flange 79 of the driven element 73.

Means are provided for coupling or connecting the annular ring 91 and the driven assembly 73 to permit relative axial movement therebetween and to provide for common rotary movement. In the disclosed construction, such means comprises a plurality of fingers or arms 103 which extend upwardly from the lower annular flange 79 towards the disk 43 and radially outwardly and which are preferably equi-angularly spaced with respect to one another. Each of the fingers 103 includes, adjacent the outer end thereof, and at a substantial distance from the axis of rotary movement and outwardly of the helical biasing spring 101, an aperture 105. In addition, such means also includes a like plurality of pins or studs 107 which extend fixedly downwardly from the annular ring 91 in parallel relation to the rotary axis and outwardly of the helical biasing spring 101, and into respective apertures 105 in the fingers 103.

Means are provided for disengaging the driving engagement of the annular ring 91 with the disk 43 and for simultaneously braking rotation of the annular ring 91 and connected driven assembly 71 without adversely affecting continued rotation of the prime mover drive shaft. While various other arrangements can be employed, in the illustrated construction, such means comprises of a brake member 111 which is supported by suitable means, such as from the cutter blade housing 13, for axial movement and against rotary movement. More particularly, the brake member 111 is annular and includes an outwardly extending lower flange 113 located in facing relation to the outer portion 97 of the friction pad 93 on the annular ring 91, together with a cylindrical wall portion 115 which extends upwardly from the radially inner margin of the lower flange 113, and an upper flange 117 extending radially inwardly from the upper margin of the cylindrical wall portion 115. The mounting means for the brake member 111 comprises a plurality of studs 121 which extend from the cutter blade housing 13 or other suitable mounting member in parallel relation to the rotary axis of the drive shaft 35 and which extend through suitable apertures 123 in the upper flange 117 of the brake member 111 so as to prevent rotary movement of the brake member 111 relative to the cutter blade housing 13, while as the same time, affording axial movement of the brake member 111 relative to the cutter blade housing 13.

Means are provided for yieldably biasing the brake member 111 upwardly to a retracted position away from engagement with the friction pad 93 on the ring 91. While various arrangements can be employed, in the illustrated construction, such means comprises for each of the studs 121, suitable spring means in the form of a helical or spiral spring 125 which encircles the associated stud 121 and which, at one end, bears against the under surface of the upper flange 117 of the brake member 111 and which, at the other end, bears against an enlarged head 127 on the lower end of the associated stud 121.

Means are provided for displacing the brake member 111 axially downwardly from the retracted position to a position engaging the ring 91 so as simultaneously to displace the ring 91 axially downward to a position disengaged from the driving disk 43 and to brake rotation of the ring 91 and therefor of the driven assembly 71. While various constructions can be employed, in the illustrated construction, such means comprises an annular actuating member 129 which includes a cylindrical wall portion 131 engaging the radially outer surface of the upper bearing 53 to afford rotary movement of the actuating member 129 relative to the cutter blade housing 13, a lower flange 133 which extends radially inwardly from the lower margin of the cylindrical wall portion 131 and which engages the under surface of the upper bearing 53 to prevent upward axial upward movement of the actuating member 129, and an upper flange 135 which extends radially outwardly from the upper end of the cylindrical wall portion 131 above the upper flange 117 of the brake member 111 and beneath the top deck of the cutter blade housing 13, and which includes, for each stud 121, an arcuately extending slot 137 which receives the associated stud 121, thereby permitting rotary movement of the actuating member 129 relative to the studs 121.

Means are provided for yieldably displacing the actuating member 129 between a brake position and a run position and for displacing the brake member 111, against the action of the brake member biasing springs 125 and against the action of the ring biasing spring 101, from the retracted position to the brake position in response to movement of the actuating member 129 from the run position to the brake position. While various other arrangements can be employed for axially displacing the brake member 111 in response to rotary actuating member movement, in the illustrated construction, such means comprises a series of angularly spaced camming balls 141, together with camming ramps 143 which are provided in one or both of the actuating member 129 and the brake member 111, which receive the camming balls 141, and which are formed such that rotary movement of the actuating member 129 from the run position to the brake position causes axial separation of the brake member 111 from the actuating member 129, i.e., causes axially downward movement of the brake member 111 so as to disengage the friction pad 93 on the ring 91 from the driving disk 43 and to engage the friction pad 93 on the ring 91 thereby braking rotation of the ring 91 and driven element 73.

Various arrangements can be provided for rotatably displacing the actuating member between the run and brake positions. In the illustrated construction, such means comprises means in the form of a main helical biasing spring 151 which yieldable urges the actuating member 129 toward the brake position and which, at one end, is connected to an anchor 153 extending fixedly from the cutter blade housing 13 and which, at the other end, is connected to an ear 155 formed on the actuating member 129. The spring 151 is of sufficient strength to normally overcome the action of both the brake member springs 125 and the ring biasing spring 101.

In addition, the means for rotatably displacing the actuating member 129 comprises an operating lever 161 mounted on the handle structure 19 for movement between a brake position extending outwardly from the handle structure 19 and shown in dotted lines in FIG. 2 and a run position adjacent to the handle structure 19 and shown in full line in FIG. 2.

In addition, there is also provided a cable 163 or other linkage extending between the operating lever 161 and the ear 155 of the actuating member 129 so that movement of the operating lever 161 causes associated rotary movement of the actuating member 129 either against the action or in response to the action of the main biasing spring 151.

In operation, the main biasing spring 151 normally biases the operating lever 161 to the brake position shown in dotted outline in FIG. 2 and additionally biases the actuating member 129 to the brake position which is effective to axially downwardly displace the brake member 111, against the action of both the brake member biasing springs 125 and the ring biasing spring 101, into engagement with the friction pad 93 on the ring 91, so as to brake rotation of the ring 91 and of the driven assembly 71, and so as also to downwardly displace the ring 91 out of driving engagement with the disk 43. Whenever it is desired to drive the driven assembly 71 from the prime mover 17, the operator can manipulate the operating lever 161 against the main biasing spring 151 to the run position adjacent to the handle structure 19, thereby rotatably displacing the actuating member 129, against the action of the main biasing spring 151, to the run position, and thereby permitting axially upwardly movement of the brake member 111, under the action of the brake member biasing springs 125, out of engagement with the friction pad 93 on the ring 91. Such axially upward movement of the brake member 111 permits axially upward displacement by the ring biasing spring 101 of the ring 91 and friction pad 93 into driving engagement by the disk 43, thereby causing rotation by the driven assembly 71 by the prime mover 17 so long as the operating lever 161 is held in adjacent relation to the handle structure 19. However, in the event that the operating lever 161 is released by the operator, the lever 161 will move to the dotted or brake position in response to the action of the main biasing spring 151 which will also cause rotation of the actuating member 129 so as to displace the brake member 111 downwardly into the brake position in engagement with the friction pad 93 on the annular ring 91, thereby disengaging the annular ring 91 from the driving disk 43 and simultaneously braking the driven assembly 71 against rotation.

It is especially to be noted that the pin and aperture connections, which are provided between the ring 91 and the driven assembly 71, which permit relative axial movement between the ring 91 and the driven assembly 71, and which also effect common rotary movement thereof, are located at a substantial radial distance from the rotary axis and outwardly from the ring biasing spring 101 so as to thereby diminish wear incident to the transmission of rotary power from the ring 91 to the driven assembly 71.

Various of the features of the invention are set forth in the following claims.

We claim:

1. A rotary lawn mower comprising a blade housing supported for travel over the ground, a prime mover mounted on said blade housing, a cutter blade, and a combined clutch and brake located between said prime mover and said cutter blade and comprising a drive assembly including a driving member driven by said prime mover for rotation about an axis, and a driving disk fixedly extending on said driving member for common rotation therewith and against axial movement therebetween, a driven assembly connected to said cutter blade, means mounting said driven assembly from said drive assembly for relative rotation therebetween and against axial movement therebetween, a ring member located in encircling relation to said driving member between said disk and said driven assembly and including a friction surface having a radially inner portion in facing relation to said disk and a radially outer portion having an outer perifery, means biasing said ring axially towards said disk for driving engagement by said disk with said inner portion of said friction surface, brake means fixed against rotary movement and movable axially between a retracted position and a braking position engaged with said outer portion of said friction surface so as to disengage said ring from said disk against the action of said biasing means and so as to prevent rotation of said ring, one or more studs extending from said ring in parallel relation to the rotary axis in the direction away from said disk, and in radially outward relation from said biasing means and in radial inward relation from said outer perifery of said ring member, and a corresponding one or more fingers extending fixedly from said driven assembly and including apertures receiving said studs to afford common rotary movement therewith and relative axial movement therebetween.

2. A combined clutch and brake comprising a drive assembly including a driving member rotatable about an axis, and a driving disk fixedly extending on said driving member for common rotation therewith and against axial movement therebetween, a driven assembly, means mounting said driven assembly from said drive assembly for relative rotation therebetween and against axial movement therebetween, a ring member located in encircling relation to said driving member between said disk and said driven assembly and including a friction surface having a radially inner portion in facing relation to said disk and a radially outer portion with an outer perifery, means biasing said ring axially towards said disk for driving engagement by said disk with said inner portion of said friction surface, brake means fixed against rotary movement and movable axially between a retracted position and a braking position engaged with said outer portion of said friction surface so as to disengage said ring from said disk against the action of said biasing means and so as to prevent rotation of said ring, one or more studs extending from said ring in parallel relation to the rotary axis in the direction away from said disk, and in radially outward relation from said biasing means and in radial inward relation from said outer perifery of said ring member, and a corresponding one or more fingers extending fixedly from said driven assembly and including apertures receiving said studs to afford common rotary movement therewith and relative axial movement therebetween.

* * * * *